(12) United States Patent
Cheng et al.

(10) Patent No.: US 10,673,748 B2
(45) Date of Patent: Jun. 2, 2020

(54) METHOD AND SYSTEM FOR ACCESSING CLOUD SERVICES

(71) Applicant: Alibaba Group Holding Limited, Grand Cayman (KY)

(72) Inventors: Gang Cheng, Bellevue, WA (US); Wei Zhao, Bellevue, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/176,907

(22) Filed: Oct. 31, 2018

(65) Prior Publication Data
US 2020/0136963 A1   Apr. 30, 2020

(51) Int. Cl.
*H04L 12/28* (2006.01)
*H04L 12/717* (2013.01)
*H04L 12/947* (2013.01)
*H04L 12/751* (2013.01)
*H04L 12/741* (2013.01)
*H04L 12/721* (2013.01)
*H04L 12/66* (2006.01)

(52) U.S. Cl.
CPC .............. *H04L 45/42* (2013.01); *H04L 45/02* (2013.01); *H04L 45/34* (2013.01); *H04L 45/74* (2013.01); *H04L 49/25* (2013.01); *H04L 12/66* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,861,345 B2 * | 10/2014 | Hares | ...................... | H04L 29/06 370/229 |
| 2002/0009081 A1 * | 1/2002 | Sampath | ............... | H04L 12/462 370/389 |
| 2003/0031167 A1 * | 2/2003 | Singh | ...................... | H04L 45/04 370/352 |
| 2004/0223497 A1 * | 11/2004 | Sanderson | .......... | H04L 12/4641 370/395.52 |
| 2015/0350077 A1 * | 12/2015 | Durrani | ................. | H04L 45/745 709/225 |
| 2017/0093686 A1 * | 3/2017 | Uttaro | ...................... | H04L 45/64 |
| 2017/0373922 A1 * | 12/2017 | Kloos | ................... | H04L 41/046 |

* cited by examiner

*Primary Examiner* — Siren Wei
(74) *Attorney, Agent, or Firm* — Lee & Hayes, P.C.

(57) ABSTRACT

Systems and methods for accessing cloud services by managing network routes are provided. A network switch may receive network routes and forward the network routes to a route server where the network routes are saved and calculated. The route server may select a subset of the calculated network routes on which the network switch is able to directly forward data packets and configure a switch forwarding table. The network switch may receive the switch forwarding table, forward data packets having destination IP addresses in the switch forwarding table to the destination IP addresses directly, and forward other data packets to the default gateway server. A default gateway server may receive the calculated network routes from the route server enabling the gate server to forward any received data packets, and receive, from the network switch, the other data packets for forwarding to their destination IP addresses.

15 Claims, 5 Drawing Sheets

METHOD AND SYSTEM FOR ACCESSING CLOUD SERVICES

BACKGROUND

As the development of cloud computing continues, a number of hybrid enterprise cloud users, who connect their own on-premise (on-prem) networks with the cloud using leased line connections, continues to increase. Cloud service providers may use a network switch or a router as an edge network device for a leased line connection and may generally utilize a border gateway protocol (BGP) for exchanging the routes for network connectivity between the on-prem network and the user virtual network on the cloud.

However, because the edge network device is shared by many hybrid cloud users, a network switch, used as an edge network device, may be limited by its routing table capacity and a number of the requested BGP sessions and routes may exceed the capacity of the network switch. Although, a router, as an edge network device, may be able to handle the number of the requested BGP sessions and routes, the cost of a router compared to a network switch is significantly higher, and the use of a router as an edge device may not be cost efficient.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to providing access to a hybrid cloud, and more specifically to providing a cost-effective access solution using a network switch as an edge device.

Figure 1:
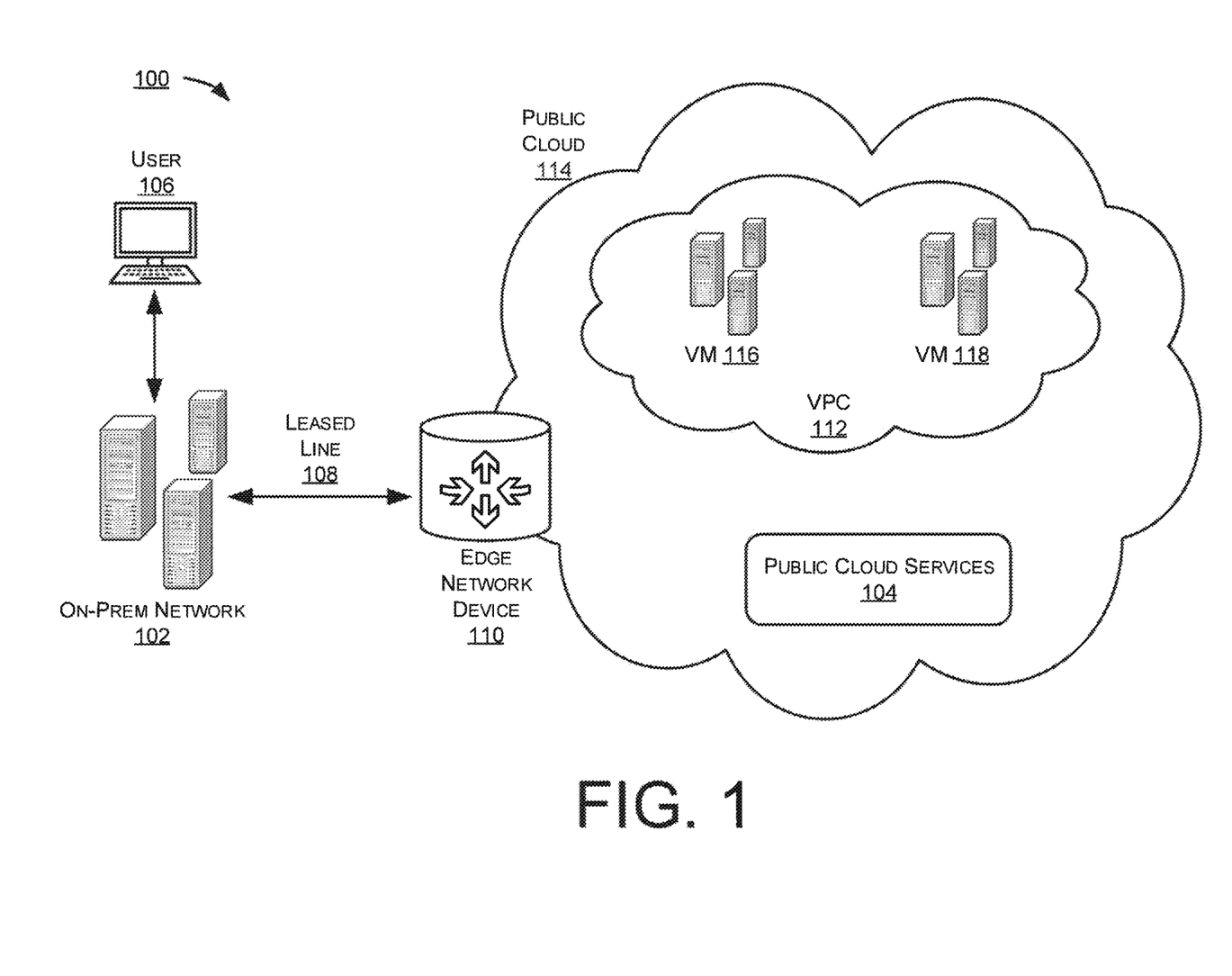
FIG. 1 illustrates an example block diagram of an on-prem network connecting to public cloud services.

FIG. 1 illustrates an example block diagram 100 of an on-prem network 102 connecting to public cloud services 104.

A hybrid cloud user 106 may connect the on-prem network 102 with the public cloud services 104 using a leased line 108. A leased line based solution may provide better network performance and security compared to other hybrid network solutions, for example, Internet protocol (IP) security (IPSec). A public cloud service provider (not shown) may use a network switch or a router as an edge network device 110 for the leased line connection. For network connectivity between the on-perm network 102 and a virtual private cloud 112 of the hybrid cloud user 106 in a public cloud 114, the BGP may generally be used for exchanging routes. The virtual private cloud 112 may include a plurality of virtual machines (VMs) of which two VMs 116 and 118 are shown in this example.

If a network switch were used as the edge network device 110, a number of BGP sessions and routes supportable would be limited to its capacity. Because the network edge device 110 may be shared by many hybrid cloud users, the number of requested BGP sessions and routes may exceed its capacity. A router, as the edge network device 110, may be able to support the number of requested BGP sessions and routes, however, it may not be cost-effective.

To address the above issues, systems and methods for accessing cloud services by managing network routes are provided. A network switch may receive network routes and forward the network routes to a route server where the network routes are saved and calculated. The route server may select a subset of the calculated network routes on which the network switch is able to directly forward data packets and configure a switch forwarding table. The network switch may receive the switch forwarding table, forward data packets having destination IP addresses in the switch forwarding table to the destination IP addresses directly, and forward other data packets, i.e., data packets having destination IP addresses not in the switch forwarding table, to the default gateway server. A default gateway server may receive the calculated network routes from the route server enabling the gate server to forward any received data packets, and receive, from the network switch, the other data packets for forwarding to their destination IP addresses. Because the cost of a default gateway server is compatible with a network switch, the total cost would be much less than a solution using a router as the edge device. Additionally, a potential problem of a network switch having a limited routing table size may be addressed with a separated route speaker and route calculation.

Figure 2:
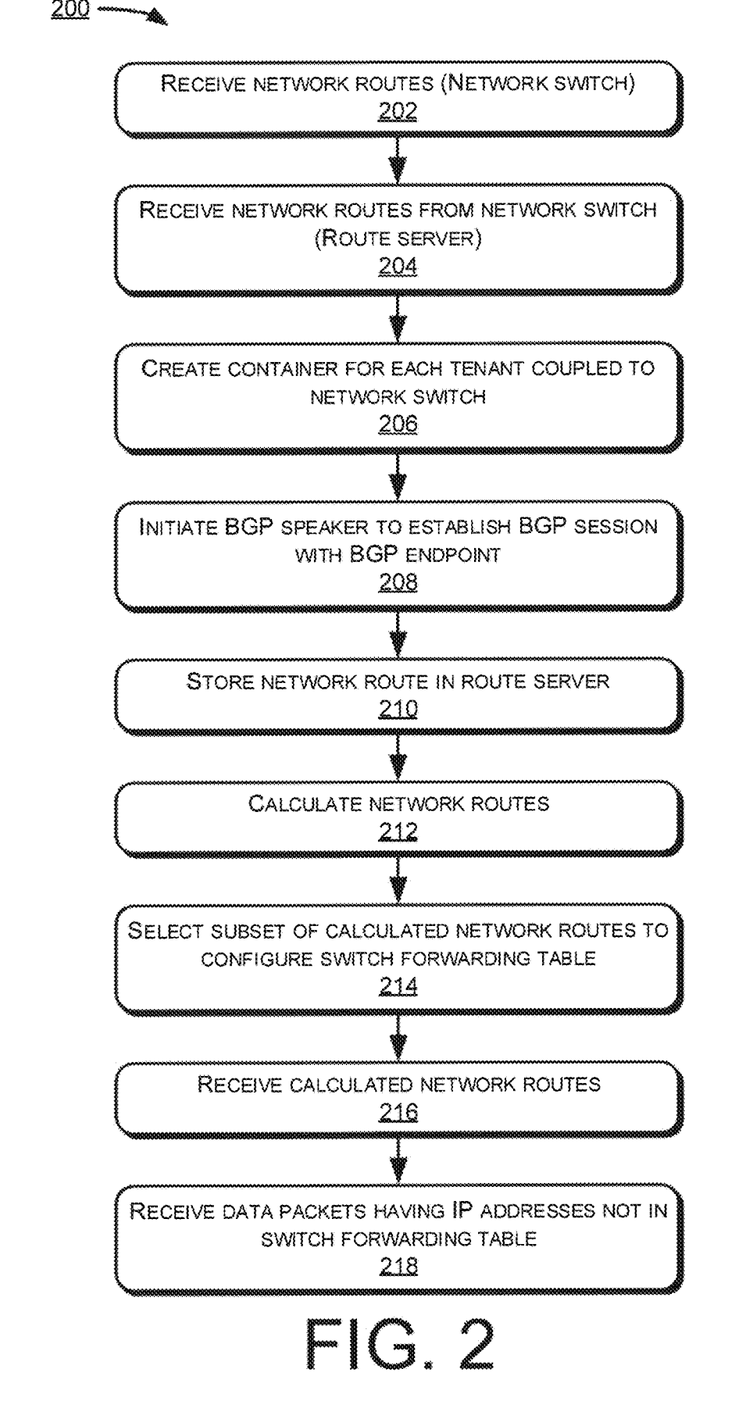
FIG. 2 illustrates an example process for accessing cloud services by managing network routes.

FIG. 2 illustrates an example process 200 for accessing cloud services by managing network routes.

At block 202, a network switch may receive network routes from a user via a leased line, and a route server may receive the network routes from the network switch at block 204. The network switch may be coupled to an Internet data center (IDC) and a plurality of tenants, and for improving isolation and security, a container for each of the plurality of tenants may be created in the network switch at block 206. At block 208, a border gateway protocol (BGP) speaker in each container may be initiated to establish a corresponding BGP session with a corresponding BGP endpoint in the IDC for exchanging network routes according to the corresponding BGP session.

At block 210, the network routes may be saved in the route server and may be calculated by the route server at block 212. The calculated network routes may include information to forward any data packet received. At block 214, a subset of the calculated network routes may be selected by the route server to configure a switch forwarding table, and the switch forwarding table may be forwarded to the network switch from the route server. The subset of the calculated network routes may be selected based on the subset of the calculated network routes being network routes on which the network switch is able to directly forward data packets. At block 216, the calculated network routes may be received by a default gateway server from the route server, enabling the gate server to forward any data packets received based on the calculated network routes. At block 218, data packets having destination IP addresses not in the switch forwarding table may be received by the default gateway server.

Figure 3:
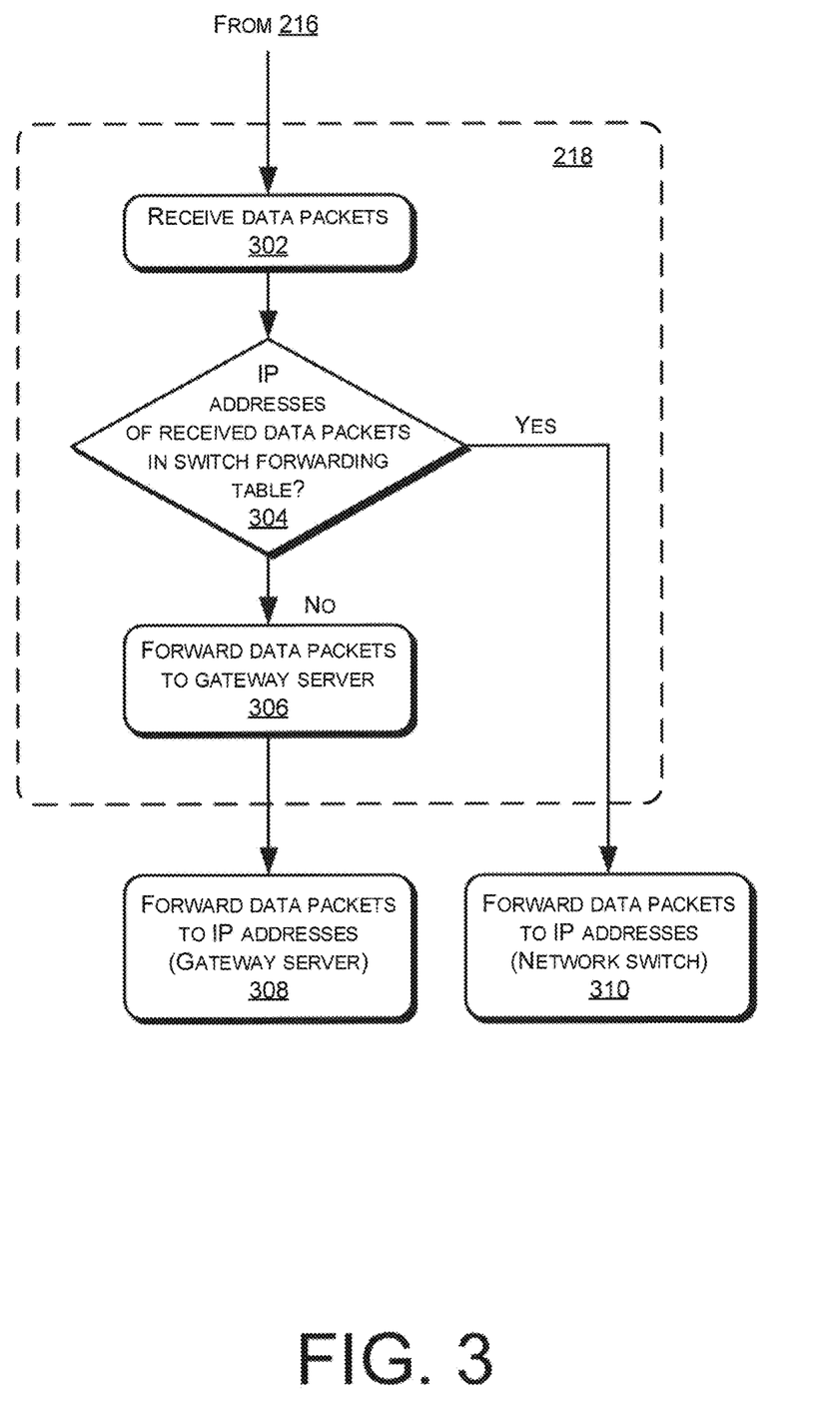
FIG. 3 illustrates an example detailed process of one of the blocks of FIG. 2.

FIG. 3 illustrates an example detailed process of block 218.

At block 302, data packets may be received by the network switch, and destination IP addresses of the received data packets may be compared with information in the switch forwarding table at block 304. For data packets having destination IP addresses not in the switch forwarding table may then be forwarded to the default gateway server at block 306 by using default routes, and the data packets having the IP addresses not in the switch forwarding table may be forwarded to the destination IP addresses by the default gateway server based on the calculated network routes at block 308. For data packets having destination IP addresses in the switch forwarding table may be forwarded to the destination IP addresses by the network switch at block 310.

Figure 4:
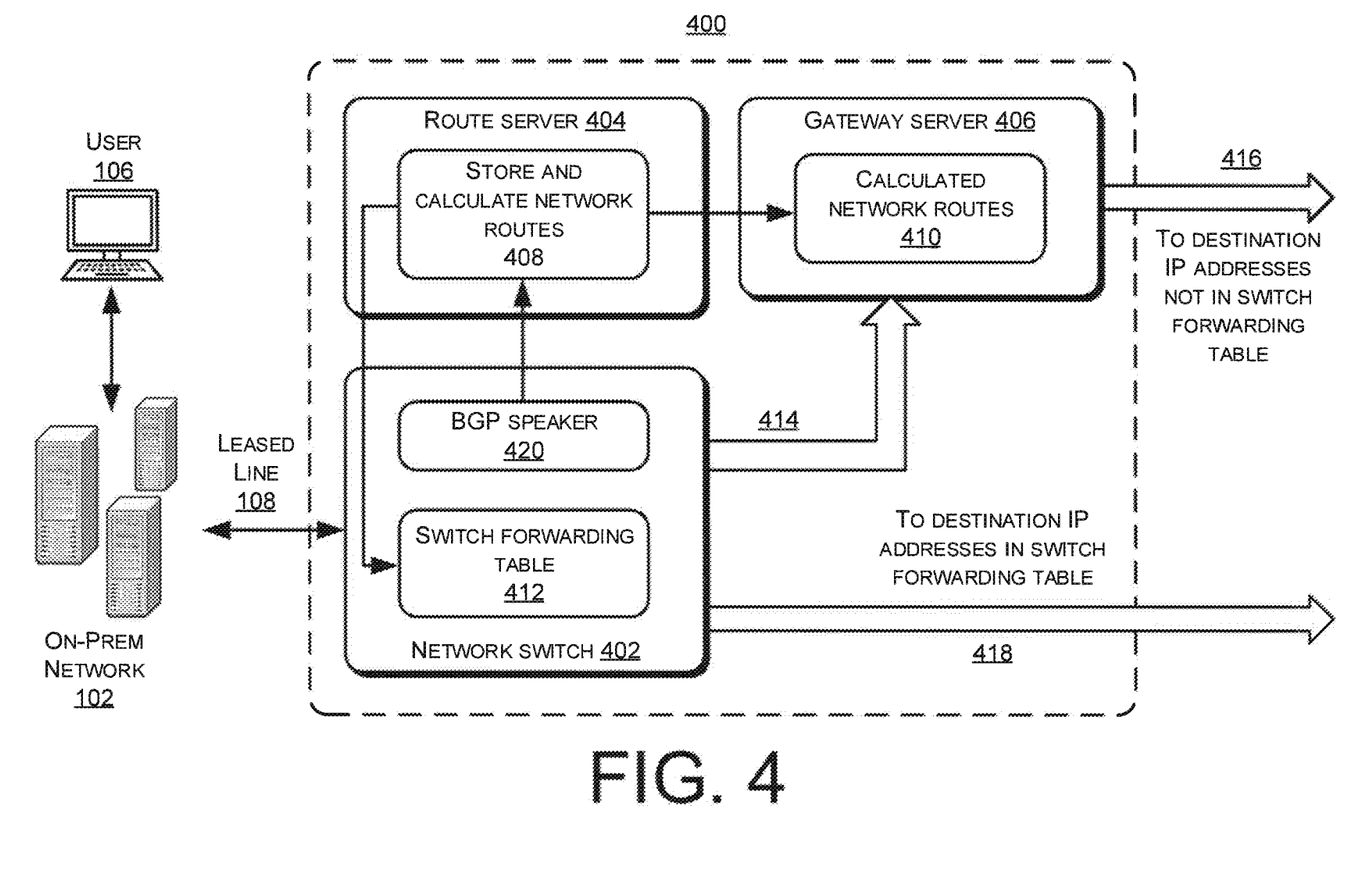
FIG. 4 illustrates an example system block diagram for accessing cloud services by managing network routes.

FIG. 4 illustrates an example block diagram of a system 400 for accessing cloud services by managing network routes.

The system 400 may comprise a network switch 402, a route server 404, and a default gateway server 406. The network switch 402 may be coupled to an Internet data center (IDC), such as the on-prem network 102, and a plurality of tenants (not shown), and may be configured to receive network routes from a user 106 via a leased line, such as the leased line 108. The route server 404 may be coupled to the network switch 402 and configured to receive the network routes 408 from the network switch 402, store and calculate the network routes 408, and select a subset of the calculated network routes 410 to configure a switch forwarding table 412. The calculated network routes 410 may include information to forward any data packet received. The default gateway server 406 may be coupled to the network switch 402 and the route server 404. The default gateway server 406 may be configured to receive the calculated network routes 410 from the route server 404 enabling the gate server 406 to forward any data packets received based on the calculated network routes 410. The gate server 406 may receive, from the network router 402, data packets having destination IP addresses not in the switch forwarding table as shown by arrow 414. The route server 404 may be further configured to select the subset of the calculated network routes to configure the switch forwarding table 412 by selecting the subset of the calculated network routes on which the network switch 402 is able to directly forward data packets.

The network switch 402 may be further configured to receive the switch forwarding table 402 from the route server 404, receive data packets, compare destination IP addresses of the received data packets with information in the switch forwarding table 412, and forward data packets having destination IP addresses not in the switch forwarding table to 412 the default gateway server 406 by using default routes as shown by the arrow 414. The default gateway server 406 may be further configured to forward the received data packets having the destination IP addresses not in the switch forwarding table 412 to the destination IP addresses as shown by arrow 416. For data packets having destination IP addresses in the switch forwarding table 412, the network switch 402 may forward the data packets directly to the destination IP addresses as shown by arrow 418.

For improving isolation and security, each of the plurality of tenants may have a corresponding container in the network switch 402, and each container may be configured to start a border gateway protocol (BGP) speaker 420 to establish a BGP session with a BGP endpoint in the IDC and to exchange network routes.

Figure 5:
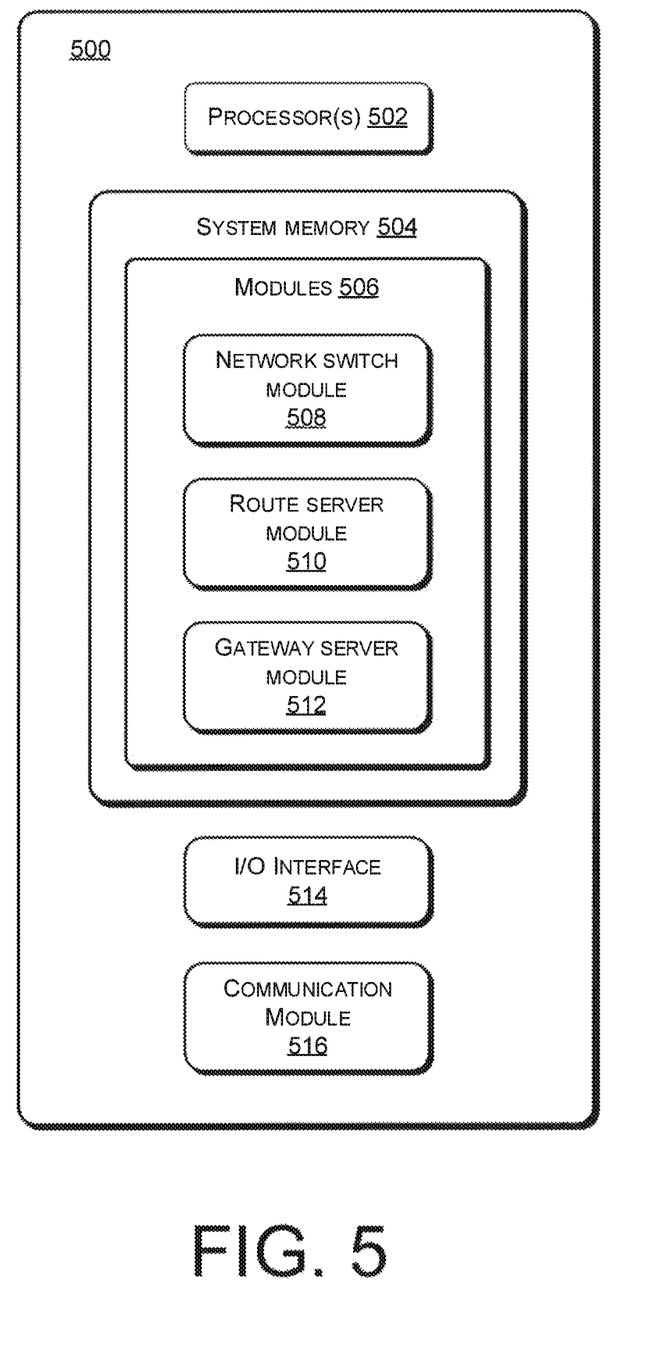
FIG. 5 illustrates an example system for implementing the processes and methods for accessing cloud services by managing network routes.

FIG. 5 illustrates an example system 500 for implementing the processes and methods described above for implementing the processes and methods for accessing cloud services by managing network routes.

The techniques and mechanisms described herein may be implemented by multiple instances of the system 500 as well as by any other computing device, system, and/or environment. The system 500 shown in FIG. 5 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 500 may include one or more processors 502 and system memory 504 communicatively coupled to the processor(s) 502. The processor(s) 502 may execute one or more modules and/or processes to cause the processor(s) 502 to perform a variety of functions. In some embodiments, the processor(s) 502 may include a central processing unit (CPU), a graphics processing unit (GPU), both CPU and GPU, or other processing units or components known in the art. Additionally, each of the processor(s) 502 may possess its own local memory, which also may store program modules, program data, and/or one or more operating systems.

Depending on the exact configuration and type of the system 500, the system memory 504 may be volatile, such as RAM, non-volatile, such as ROM, flash memory, miniature hard drive, memory card, and the like, or some combination thereof. The system memory 504 may include one or more computer-executable modules (modules) 506 that are executable by the processor(s) 502.

The modules 506 may include, but are not limited to, a network switch module 508, a route server module 510, and a default gateway server module 512. The network switch module 508 may be coupled to an Internet data center (IDC), such as the on-prem network 104 of FIG. 1, and a plurality of tenants (not shown). The network switch module 508 may be configured to receive network routes from a user via a leased line as illustrated with reference to FIGS. 2-4. The route server module 510 may be communicatively coupled to the network switch module 508, and may be configured to receive the network routes from the network switch module 508, store and calculate the network routes, and select a subset of the calculated network routes to configure a switch forwarding table. The route server module 510 may be configured to select the subset of the calculated network routes to configure the switch forwarding table by selecting the subset of the calculated network routes on which the network switch module is able to directly forward data packets.

The default gateway server module 512 may be communicatively coupled to the network switch module 508 and the route server module 510, and may be configured to receive the calculated network routes from the route server module 510 and receive, from the network router module 508, data packets having destination IP addresses not in the switch forwarding table. For improving isolation and security, each of the plurality of tenants may have a corresponding container in the network switch module 508, and each container may be configured to start a border gateway protocol (BGP) speaker to establish a BGP session with a BGP endpoint in the IDC and to exchange network routes.

The network switch module 508 may be further configured to receive the switch forwarding table from the route server module 510, receive data packets, compare destination IP addresses of the received data packets with information in the switch forwarding table, and forward data packets having destination IP addresses not in the switch forwarding table to the default gateway server module 512 by using default routes. The default gateway server module 512 may be configured to forward the received data packets, having the destination IP addresses not in the switch forwarding table, to the destination IP addresses. For data packets having destination IP addresses in the switch forwarding table, the network switch module 508 may be configured to forward the data packets directly to the destination IP addresses.

The system 500 may additionally include an input/output (I/O) interface 514 for receiving data packets and communications from a user such as the user 106 shown in FIG. 1. The system 500 may also include a communication module 516 allowing the system 500 to communicate with other devices (not shown) over a network (not shown). The network may include the Internet, wired media such as a wired network or direct-wired connections, and wireless media such as acoustic, radio frequency (RF), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 2-5c. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A. A method comprising: receiving network routes by a network switch; receiving, by a route server, the network routes from the network switch; storing the network routes in the route server; calculating the network routes by the route server; selecting, by the route server, a subset of the calculates network routes to configure a switch forwarding table; receiving the switch forwarding table by a default gateway server from the route server; and receiving, by the default gateway server from the network switch, data packets having destination IP addresses not in the switch forwarding table.

B. The method as paragraph A recites, wherein receiving the network routes by the network switch includes receiving the network routes from a user via a leased line.

C. The method as paragraph A recites, wherein selecting, by the route server, the subset of the calculated network routes to configure the switch forwarding table includes selecting the subset of the calculated network routes on which the network switch is able to directly forward data packets.

D. The method as paragraph C recites, further comprising receiving, by the network switch, the switch forwarding table from the route server.

E. The method as paragraph D recites, further comprising, by the network switch: receiving data packets, comparing destination IP addresses of the received data packets with information in the switch forwarding table, and forwarding data packets having destination IP addresses not in the switch forwarding table to the default gateway server.

F. The method as paragraph E recites, further comprising forwarding, by the network switch, the data packets having the destination IP addresses not in the switch forwarding table to the default gateway server by using default routes.

G. The method as paragraph E recites, further comprising forwarding, by the default gateway server, the received data packets having the IP addresses not in the switch forwarding table to the destination IP addresses.

H. The method as paragraph A recites, further comprising: creating, in the network switch, a corresponding container for each of a plurality of tenants coupled to the network switch; initiating a border gateway protocol (BGP) speaker in the corresponding container to establish a corresponding BGP session with a corresponding BGP endpoint in an Internet data center (IDC) coupled to the network switch; and exchanging network routes according to the corresponding BGP session.

I. A system comprising: a network switch coupled to an Internet data center (IDC) and a plurality of tenants, the network switch configured to receive network routes; a route server coupled to the network switch, the route server configured to: receive the network routes from the network switch, store and calculate the network routes, and select a subset of the calculated network routes to configure a switch forwarding table; and a default gateway server coupled to the network switch and the route server, the default gateway server configured to receive the calculated network routes from the route server and to receive, from the network switch, data packets having destination IP addresses not in the switch forwarding table.

J. The system as paragraph I recites, wherein: each of the plurality of tenants has a corresponding container in the network switch, and each container is configured to start a border gateway protocol (BGP) speaker to establish a BGP session with a BGP endpoint in the IDC and to exchange network routes.

K. The system as paragraph I recites, wherein the network switch is further configured to receive the network routes from a user via a leased line.

L. The system as paragraph I recites, wherein the route server is further configured to select the subset of the calculated network routes to configure the switch forwarding table by selecting the subset of the calculated network routes on which the network switch is able to directly forward data packets.

M. The system as paragraph L recites, wherein the network switch is further configured to receive the switch forwarding table from the route server.

N. The system as paragraph M recites, wherein the network switch is further configured to: receive data packets, compare destination IP addresses of the received data packets with information in the switch forwarding table, and forward data packets having destination IP addresses not in the switch forwarding table to the default gateway server.

O. The system as paragraph N recites, wherein the network switch is further configured to forward the data packets having the destination IP addresses not in the switch forwarding table to the default gateway server by using default routes.

P. The system as paragraph N recites, wherein the default gateway server is further configured to forward the received data packets having the destination IP addresses not in the switch forwarding table to the destination IP addresses.

Q. A computer-readable storage medium storing computer-readable instructions executable by one or more processors, that when executed by the one or more processors, cause the one or more processors to perform operations comprising: receiving network routes by a network switch; receiving, by a route server, the network routes from the network switch; storing the network routes in the route server; calculating the network routes by the route server; selecting, by the route server, a subset of the calculated network routes to configure a switch forwarding table, the subset of the calculated network routes being routes on which the network switch is able to directly forward data packets; receiving the switch forwarding table by a default gateway server from the route server; and receiving, by the default gateway server from the network switch, data packets having IP addresses not in the switch forwarding table.

R. The computer-readable storage medium as paragraph Q recites, wherein the operations further comprise: receiving, by the network switch, the switch forwarding table from the route server; receiving, by the network switch, data packets; comparing, by the network switch, destination IP addresses of the received data packets with information in the switch forwarding table; and forwarding, by the network switch, data packets having IP addresses not in the switch forwarding table to the default gateway server.

S. The computer-readable storage medium as paragraph R recites, wherein the operations further comprise: forwarding, by the network switch, the data packets having the IP addresses not in the switch forwarding table to the default gateway server by using default routes; and forwarding, by the default gateway server, the received data packets having the destination IP addresses not in the switch forwarding table to the destination IP addresses.

T. The computer-readable storage medium as paragraph Q recites, wherein the operations further comprise: creating, in the network switch, a corresponding container for each of a plurality of tenants coupled to the network switch; initiating a border gateway protocol (BGP) speaker in the corresponding container to establish a corresponding BGP session with a corresponding BGP endpoint in an Internet data center (IDC) coupled to the network switch; and exchanging network routes according to the corresponding BGP session.

U. A system comprising: one or more processors; and memory communicatively coupled to the one or more processors, the memory storing computer-executable modules executable by the one or more processors, the computer-executable modules including: a network switch module communicatively coupled to an Internet data center (IDC) and a plurality of tenants, the network switch module configured to receive network routes; a route server module communicatively coupled to the network switch module, the route server module configured to: receive the network routes from the network switch module, store and calculate the network routes, and select a subset of the calculated network routes to configure a switch forwarding table; and a default gateway server module communicatively coupled to the network switch module and the route server module, the default gateway server module configured to receive the calculated network routes from the route server module and to receive, from the network router module, data packets having destination IP addresses not in the switch forwarding table.

V. The system as paragraph U recites, wherein: each of the plurality of tenants has a corresponding container in the network switch, and each container is configured to start a border gateway protocol (BGP) speaker to establish a BGP session with a BGP endpoint in the IDC and to exchange network routes.

W. The system as paragraph U recites, wherein the network switch module is further configured to receive the network routes from a user via a leased line.

X. The system as paragraph U recites, wherein the route server module is further configured to select the subset of the calculated network routes to configure the switch forwarding table by selecting the subset of the calculated network routes on which the network switch module is able to directly forward data packets.

Y. The system as paragraph X recites, wherein the network switch module is further configured to receive the switch forwarding table from the route server module.

Z. The system of claim Y, wherein the network switch module is further configured to: receive data packets, compare destination IP addresses of the received data packets with information in the switch forwarding table, and forward data packets having destination IP addresses not in the switch forwarding table to the default gateway server module.

AA. The system as paragraph Z recites, wherein the network switch module is further configured to forward the data packets having the destination IP addresses not in the switch forwarding table to the default gateway server module by using default routes.

AB. The system as paragraph Z recites, wherein the default gateway server module is further configured to forward the received data packets having the destination IP addresses not in the switch forwarding table to the destination IP addresses.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving network routes by a network switch, the network switch having a limited routing table size;
   receiving, by a route server, the network routes from the network switch;
   storing the network routes in the route server;
   calculating the network routes by the route server;
   selecting, by the route server, a subset of the calculates network routes to configure a switch forwarding table;
   receiving the calculated network routes by a default gateway server from the route server;
   receiving, by the network switch, the switch forwarding table from the route server;
   receiving, by the network switch, data packets;
   comparing, by the network switch, destination IP addresses of the received data packets with information in the switch forwarding table,
   for data packets having destination IP addresses not in the switch forwarding table:
      forwarding, by the network switch, the data packets having destination IP addresses not in the switch forwarding table to the default gateway server, and
      forwarding, by the default gateway server, the received data packets having the IP addresses not in the switch forwarding table to the destination IP addresses; and
   for data packets having destination IP addresses in the switch forwarding table:
      forwarding, by the network switch, the data packets having destination IP addresses in the switch forwarding table to the destination IP addresses.

2. The method of claim 1, wherein receiving the network routes by the network switch includes receiving the network routes from a user via a leased line.

3. The method of claim 1, wherein selecting, by the route server, the subset of the calculated network routes to configure the switch forwarding table includes selecting the subset of the calculated network routes on which the network switch is able to directly forward data packets.

4. The method of claim 1, wherein forwarding, by the network switch, the data packets having the destination IP addresses not in the switch forwarding table to the default gateway server includes forwarding, by the network switch, the data packets to the default gateway server by using default routes.

5. The method of claim 1, further comprising:
   creating, in the network switch, a corresponding container for each of a plurality of tenants coupled to the network switch;
   initiating a border gateway protocol (BGP) speaker in the corresponding container to establish a corresponding BGP session with a corresponding BGP endpoint in an Internet data center (IDC) coupled to the network switch; and
   exchanging network routes according to the corresponding BGP session.

6. A system comprising:
   one or more processors; and
   memory communicatively coupled to the one or more processors, the memory storing computer-executable modules executable by the one or more processors, the computer-executable modules including:
   a network switch module communicatively coupled to an Internet data center (IDC) and a plurality of tenants, the network switch module configured to receive network routes and having a limited routing table size;
   a route server module communicatively coupled to the network switch module, the route server module configured to:
      receive the network routes from the network switch module,
      store and calculate the network routes, and
      select a subset of the calculated network routes to configure a switch forwarding table; and
   a default gateway server module communicatively coupled to the network switch module and the route server module, the default gateway server module configured to receive the calculated network routes from the route server module,
   wherein the network switch module is further configured to:
      receive the switch forwarding table from the route server module,
      receive data packets,
      compare destination IP addresses of the received data packets with information in the switch forwarding table,
      for data packets having destination IP addresses not in the switch forwarding table:
         forward data packets having destination IP addresses not in the switch forwarding table to the default gateway server module,
      for data packets having destination IP addresses in the switch forwarding table:
         forwarding the data packets having destination IP addresses in the switch forwarding table to the destination IP addresses, and
   wherein the default gateway server module is further configured to forward the received data packets having the IP addresses not in the switch forwarding table to the destination IP addresses.

7. The system of claim 6, wherein:
   each of the plurality of tenants has a corresponding container in the network switch, and each container is configured to start a border gateway protocol (BGP) speaker to establish a BGP session with a BGP endpoint in the IDC and to exchange network routes.

8. The system of claim 6, wherein the network switch module is further configured to receive the network routes from a user via a leased line.

9. The system of claim 6, wherein the route server module is further configured to select the subset of the calculated network routes to configure the switch forwarding table by selecting the subset of the calculated network routes on which the network switch module is able to directly forward data packets.

10. The system of claim 9, wherein the network switch module is further configured to forward the data packets having the destination IP addresses not in the switch forwarding table to the default gateway server module by using default routes.

11. A computer-readable storage medium storing computer-readable instructions executable by one or more processors, that when executed by the one or more processors, cause the one or more processors to perform operations comprising:
receiving network routes by a network switch, the network switch having a limited routing table size;
receiving, by a route server, the network routes from the network switch;
storing the network routes in the route server;
calculating the network routes by the route server;
selecting, by the route server, a subset of the calculated network routes to configure a switch forwarding table, the subset of the calculated network routes being routes on which the network switch is able to directly forward data packets;
receiving the calculated network routes by a default gateway server from the route server;
receiving, by the network switch, the switch forwarding table from the route server;
receiving, by the network switch, data packets;
comparing, by the network switch, destination IP addresses of the received data packets with information in the switch forwarding table,
for data packets having destination IP addresses not in the switch forwarding table:
forwarding, by the network switch, the data packets having destination IP addresses not in the switch forwarding table to the default gateway server, and
forwarding, by the default gateway server, the received data packets having the IP addresses not in the switch forwarding table to the destination IP addresses; and
for data packets having destination IP addresses in the switch forwarding table:
forwarding, by the network switch, the data packets having destination IP addresses in the switch forwarding table to the destination IP addresses.

12. The computer-readable storage medium of claim 11, wherein forwarding, by the network switch, the data packets having the IP addresses not in the switch forwarding table to the default gateway server includes forwarding, by the network switch, the data packets to the default gateway server by using default routes.

13. The computer-readable storage medium of claim 11, wherein the operations further comprise:
creating, in the network switch, a corresponding container for each of a plurality of tenants coupled to the network switch;
initiating a border gateway protocol (BGP) speaker in the corresponding container to establish a corresponding BGP session with a corresponding BGP endpoint in an Internet data center (IDC) coupled to the network switch; and
exchanging network routes according to the corresponding BGP session.

14. The computer-readable storage medium of claim 11, wherein receiving the network routes by the network switch includes receiving the network routes from a user via a leased line.

15. The computer-readable storage medium of claim 11, wherein selecting, by the route server, the subset of the calculated network routes to configure the switch forwarding table includes selecting the subset of the calculated network routes on which the network switch is able to directly forward data packets.

* * * * *